United States Patent
Park et al.

(10) Patent No.: US 10,566,011 B2
(45) Date of Patent: Feb. 18, 2020

(54) AUTO VOICE TRIGGER METHOD AND AUDIO ANALYZER EMPLOYING THE SAME

(71) Applicant: SAMSUNG ELECTRONICS CO., LTD., Suwon-si (KR)

(72) Inventors: Sangha Park, Seoul (KR); Sungchan Kang, Hwaseong-si (KR); Cheheung Kim, Yongin-si (KR); Yongseop Yoon, Seoul (KR); Choongho Rhee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 15/806,863

(22) Filed: Nov. 8, 2017

(65) Prior Publication Data
US 2018/0130485 A1    May 10, 2018

(30) Foreign Application Priority Data
Nov. 8, 2016  (KR) .................. 10-2016-0148187

(51) Int. Cl.
| | | |
|---|---|---|
| *G10L 25/84* | (2013.01) | |
| *G10L 25/21* | (2013.01) | |
| *H04R 1/40* | (2006.01) | |
| *G10L 17/22* | (2013.01) | |
| *H04R 1/24* | (2006.01) | |
| *H04R 1/28* | (2006.01) | |
| *H04R 17/02* | (2006.01) | |
| *H04R 17/10* | (2006.01) | |

(52) U.S. Cl.
CPC .............. *G10L 25/84* (2013.01); *G10L 17/22* (2013.01); *G10L 25/21* (2013.01); *H04R 1/245* (2013.01); *H04R 1/406* (2013.01); *H04R 1/28* (2013.01); *H04R 17/025* (2013.01); *H04R 17/10* (2013.01); *H04R 2430/03* (2013.01)

(58) Field of Classification Search
CPC .................. G10L 25/78; G10L 2021/02166
See application file for complete search history.

(56) References Cited

U.S. PATENT DOCUMENTS

| | | | | |
|---|---|---|---|---|
| 5,715,319 A | * | 2/1998 | Chu .................. | H04R 3/005 381/26 |
| 6,009,396 A | * | 12/1999 | Nagata ................ | G10L 15/26 381/92 |
| 7,826,623 B2 | * | 11/2010 | Christoph .......... | H04R 1/406 367/118 |

(Continued)

FOREIGN PATENT DOCUMENTS

| | | |
|---|---|---|
| JP | 2004-251751 A | 9/2004 |
| KR | 10-2016-0020287 A | 2/2016 |

(Continued)

*Primary Examiner* — Brian L Albertalli
(74) *Attorney, Agent, or Firm* — Sughrue Mion, PLLC

(57) ABSTRACT

An auto voice trigger method and an audio analyzer employing the same are provided. The auto voice trigger method includes: receiving a signal by at least one resonator microphone included in an array of a plurality of resonator microphones with different frequency bandwidths; analyzing the received signal and determining whether the received signal is a voice signal; and when it is determined that the received signal is the voice signal, waking up a whole system to receive and analyze a wideband signal.

18 Claims, 21 Drawing Sheets

(56) References Cited

U.S. PATENT DOCUMENTS

| | | | |
|---|---|---|---|
| 7,889,873 B2* | 2/2011 | Sorensen | H04R 1/406 381/92 |
| 8,357,981 B2* | 1/2013 | Martin | G10K 9/125 257/415 |
| 8,964,966 B2* | 2/2015 | Michaelis | H04M 1/253 379/387.02 |
| 9,269,352 B2* | 2/2016 | Talwar | G10L 15/005 |
| 9,668,048 B2* | 5/2017 | Sakri | H04M 9/08 |
| 9,755,604 B2* | 9/2017 | Gottlieb | H04R 3/04 |
| 9,779,732 B2 | 10/2017 | Lee et al. | |
| 9,830,913 B2* | 11/2017 | Thomsen | G10L 15/22 |
| 10,079,026 B1* | 9/2018 | Ebenezer | G10L 21/0208 |
| 10,181,329 B2* | 1/2019 | Lepauloux | G10L 21/0264 |
| 2002/0141601 A1* | 10/2002 | Finn | H04R 3/005 381/92 |
| 2003/0142812 A1 | 7/2003 | Allen et al. | |
| 2005/0207566 A1* | 9/2005 | Ohki | H04M 9/082 379/406.01 |
| 2009/0222264 A1 | 9/2009 | Pilati et al. | |
| 2014/0086433 A1* | 3/2014 | Josefsson | H04R 3/06 381/98 |
| 2015/0049884 A1* | 2/2015 | Ye | G06F 3/16 381/122 |
| 2015/0380013 A1* | 12/2015 | Nongpiur | G10L 25/51 704/231 |
| 2017/0006385 A1 | 1/2017 | Kim | |
| 2017/0133041 A1* | 5/2017 | Mortensen | G10L 25/18 |
| 2018/0038901 A1 | 2/2018 | Kim et al. | |

FOREIGN PATENT DOCUMENTS

| | | |
|---|---|---|
| KR | 10-2016-0064258 A | 6/2016 |
| KR | 10-2018-0015482 A | 2/2018 |

\* cited by examiner (TRIGGER OFF STATE)

(TRIGGER ON STATE)

(TRIGGER OFF STATE)

(TRIGGER ON STATE)

FIG. 13

COMPARISON OF POWER CONSUMPTION BETWEEN fs=44.1 kHz AND FS=4.21 kHz

| RHD2164 Digital Electrophysiology Interface Chip (system acquisition system) based | EXISTING METHOD | EMBODIMENT |
|---|---|---|
| high frequency : | 44.1 kHz | 4.41 kHz |
| sampling rate (ch * (2*$f_H$ [kS/s/ch])) : | 88.2 kS/s | 8.82 kS/s |
| Baseline amplifier array current: | 200 uA | 200 uA |
| Amplifiers (ch *7.6 * fH) : | 335.16 uA | 33.516 uA |
| Baseline ADC current: | 840 uA | 840 uA |
| ADC/MUX (2.14 * sampling rate) : | 188.748 uA | 18.8748 uA |
| LVDS I/O: | 5700 uA | 5700 uA |
| Temperature sensor: | 70 uA | 70 uA |
| Supply voltage sensor: | 10 uA | 10 uA |
| Total supply current : | 7.34 mA | 6.87 mA |
| Total power dissipation : | 7.34mA*3.3V = 24.2 mW | 6.87mA*3.3V = 22.7 mW |

AUTO VOICE TRIGGER METHOD AND AUDIO ANALYZER EMPLOYING THE SAME

CROSS-REFERENCE TO RELATED APPLICATION

This application claims priority from Korean Patent Application No. 10-2016-0148187, filed on Nov. 8, 2016, in the Korean Intellectual Property Office, the disclosure of which is incorporated herein in its entirety by reference.

BACKGROUND

1. Field

The present disclosure relates to an auto voice trigger method and an audio analyzer employing the same.

2. Description of the Related Art

Audio analyzers analyze audio spectrums and may be used for situation recognition, voice recognition, speaker authentication, voice secretary, or the like in cell phones, TVs, computers, home appliances, vehicles, or smart home environments.

Voice trigger methods for voice recognition, speaker authentication, or voice secretary may largely divided into two types of methods.

In the first type, voice recognition or speaker authentication is started through a manual operation of a user who presses a "start" button when the user wants to use a voice recognition or speaker authentication system.

The second type is an auto voice trigger method of waking up a voice analysis system when a signal received in real time from a microphone that is always turned on is analyzed and a received word is determined to be similar to a voice registered by a user or a specific word designated by the user.

Between the two voice trigger types, the voice auto trigger method is widely used in various ways owing to user convenience. According to a most generally used auto voice trigger method, if the energy of a signal received by a wideband microphone is greater than a threshold, it is determined that a voice signal is received, and a voice analysis system is woken up.

Although the auto voice trigger method is convenient for the users, the computational amount and power consumption of this method are high since a microphone needs to be always turned on and a signal received in real time needs to be analyzed.

According to a most generally used energy based auto voice trigger method, since it is determined whether a voice signal is generated based on a signal energy value of the entire frequency band, even a loud noise can trigger the voice recognition system, and thus, the accuracy may be reduced in a noisy environment. To increase the accuracy of the auto voice trigger, voice trigger methods that are more resilient to a noise signal by separating and analyzing signals received through a microphone according to frequency bands have been suggested. These methods have increased accuracy of the auto voice trigger, but the computational amount and power consumption for signal analysis are large.

Also, since signals other than those pertaining to a frequency band for voice are received through a wideband microphone and analyzed in real time for both auto voice trigger methods, both methods have a considerable baseline load for power consumption and computational amount.

SUMMARY

Provided are auto voice trigger methods that use a resonator array microphone, have reduced computational amount and power consumption and increased accuracy of determining a voice signal and audio analyzers employing the same.

Additional aspects will be set forth in part in the description which follows and, in part, will be apparent from the description, or may be learned by practice of the presented embodiments.

According to an aspect of an exemplary embodiment, an auto voice trigger method may include: receiving a signal by at least one resonator microphone included in an array of a plurality of resonator microphones with different frequency bandwidths; analyzing the received signal and determining whether the received signal is a voice signal; and in response to determining that the received signal is the voice signal, waking up a whole system to receive and analyze a wideband signal.

The wideband signal may be received and analyzed via the plurality of resonator microphones.

The wideband signal may be received and analyzed via a wideband microphone.

When a number of the plurality of resonator microphones is P1, and a number of the at least one resonator microphone used to determine the voice signal is P2, a number of the at least one resonator microphone used to determine the voice signal may satisfy a condition P2<P1, wherein P2 is equal to or greater than 1.

The at least one resonator microphone used to determine the voice signal may include one resonator microphone operating in a frequency bandwidth within a voice signal band.

The at least one resonator microphone used to determine the voice signal may further include at least one resonator microphone operating in a frequency bandwidth beyond the voice signal band so as to distinguish the voice signal from noise by comparing received signals.

The at least one resonator microphone used to determine the voice signal may include two or more resonator microphones operating in frequency bandwidths within a voice signal band.

The two or more resonator microphones used to determine the voice signal may have adjacent frequency bandwidths.

The plurality of resonator microphones may be arranged in an order of frequency bandwidths, and at least one resonator microphone operating in a frequency bandwidth between the frequency bandwidths of the two or more resonator microphones used to determine the voice signal is located between the two or more resonator microphones used to determine the voice signal.

The two or more resonator microphones used to determine the voice signal may further include at least one resonator microphone operating in a frequency bandwidth beyond the voice signal band so as to distinguish a signal from noise by comparing received signals.

According to an aspect of an exemplary embodiment, an audio analyzer includes: an array of a plurality of resonator microphones with different frequency bandwidths; an auto voice trigger configured to determine whether a signal received by some resonator microphones among the plurality of resonator microphones with different frequency bandwidths is a voice signal; and a controller, configured to wake up a whole system to receive and analyze a wideband signal, in response to determining that the signal received from the auto voice trigger is the voice signal.

The wideband signal may be received and analyzed via the plurality of resonator microphones.

The audio analyzer may further include: a wideband microphone configured to receive and analyze the wideband signal.

When a number of the plurality of resonator microphones is P1, and a number of at least one resonator microphone used to determine the voice signal is P2, a number of the at least one resonator microphone used to determine the voice signal may satisfy a condition P2<P1, wherein P2 is equal to or greater than 1.

At least one resonator microphone used to determine the voice signal may include one resonator microphone operating in a frequency bandwidth within a voice signal band.

The at least one resonator microphone used to determine the voice signal may further include at least one resonator microphone operating in a frequency bandwidth beyond the voice signal band, so as to distinguish the voice signal from noise by comparing received signals.

At least one resonator microphone used to determine the voice signal may include two or more resonator microphones operating in frequency bandwidths within a voice signal band.

The two or more resonator microphones used to determine the voice signal may have adjacent frequency bandwidths.

The plurality of resonator microphones may be arranged in an order of frequency bandwidths, and at least one resonator microphone operating in a frequency bandwidth between the frequency bandwidths of the two or more resonator microphones used to determine the voice signal is located between the two or more resonator microphones used to determine the voice signal.

The two or more resonator microphones used to determine the voice signal may further include at least one resonator microphone operating in a frequency bandwidth beyond the voice signal band, so as to distinguish the voice signal from noise by comparing received signals.

BRIEF DESCRIPTION OF THE DRAWINGS

The above and/or other aspects will become apparent and more readily appreciated from the following description of the embodiments, taken in conjunction with the accompanying drawings in which:

FIG. 13 illustrates a power consumption comparison when a sampling frequency is fs=4.41 kHz according to the embodiment of FIG. 11 and a sampling frequency is fs=44.1 kHz, according to the existing method of FIG. 12;

DETAILED DESCRIPTION

Figure 1:
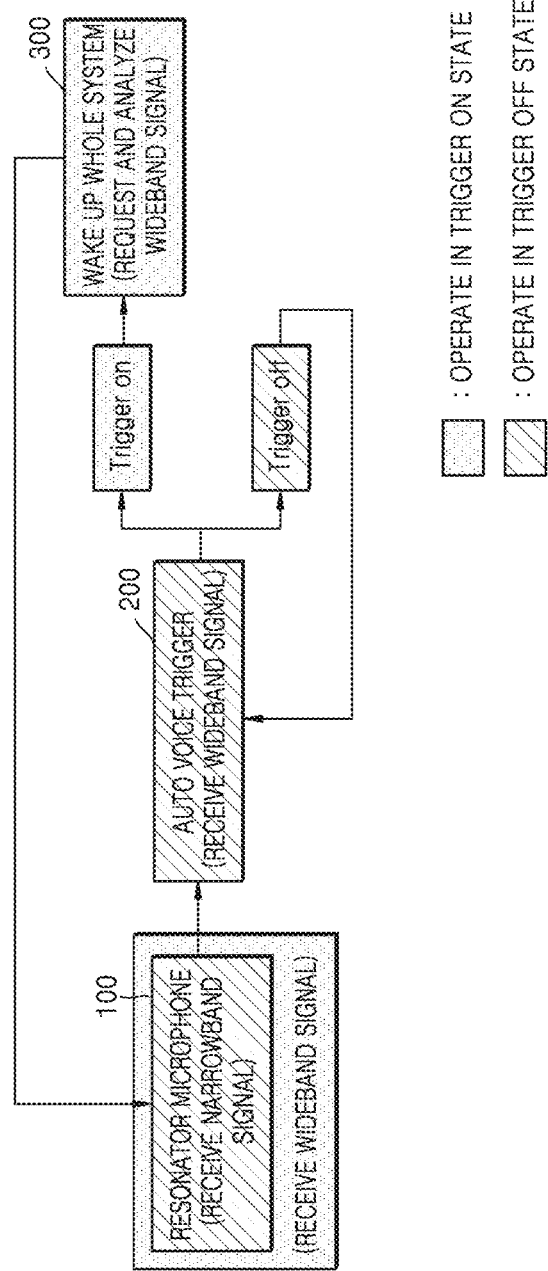
FIG. 1 is a schematic block diagram of an audio analyzer applying an auto voice trigger method according to an embodiment.

Reference will now be made in detail to exemplary embodiments illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects.

Figure 2:
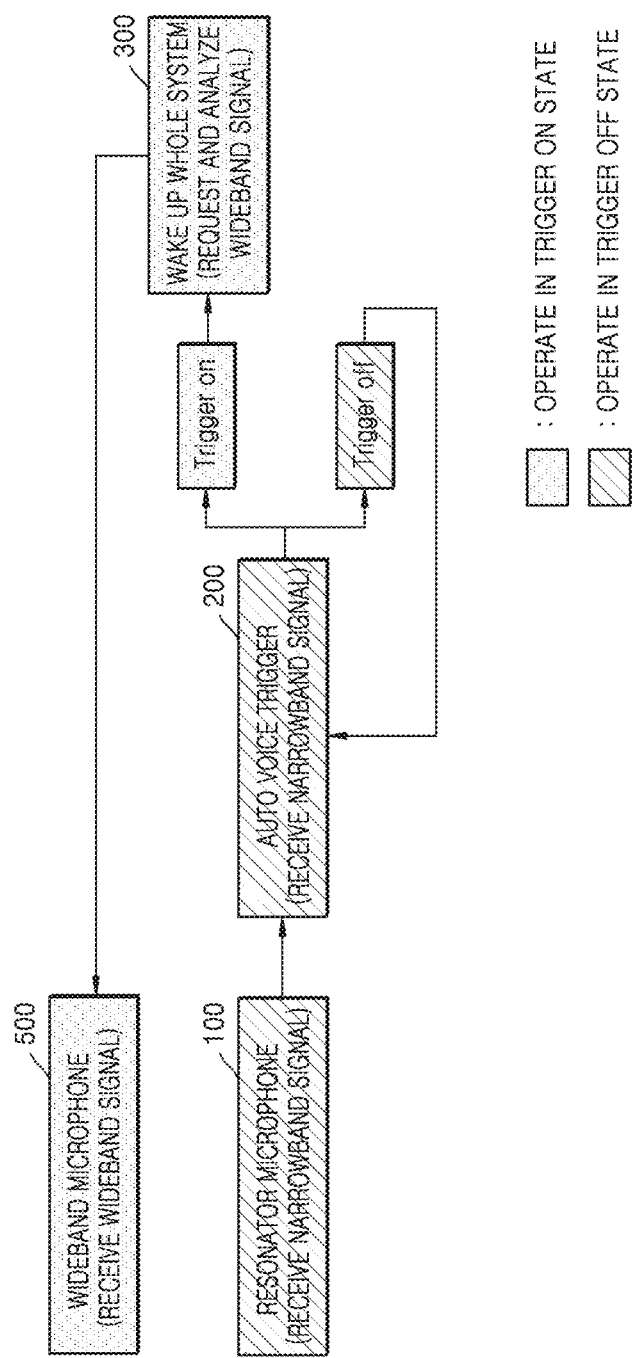
FIG. 2 is a schematic block diagram of an audio analyzer applying an auto voice trigger method according to another embodiment.

FIG. 1 is a schematic block diagram of an audio analyzer applying an auto voice trigger method according to an exemplary embodiment. FIG. 2 is a schematic block diagram of an audio analyzer applying an auto voice trigger method according to another exemplary embodiment. As shown in FIG. 1, while a whole system is woken up (e.g., activated) by an auto voice trigger 200, a resonator microphone array 100 that includes a plurality of resonator microphones receive and analyze a wideband signal. As shown in FIG. 2, while a whole system is woken up by the auto voice trigger 200, a wideband microphone 500 receives and analyzes a wideband signal.

Referring to FIGS. 1 and 2, the audio analyzer may include the resonator microphone array 100 with different frequency bandwidths, the auto voice trigger 200, and a controller 300. The system may be in a power saving mode (e.g., sleep mode) while the resonator microphone array 100 is monitoring for a trigger voice signal. In other words, power may be provided to only a portion of the system when the resonator microphone array 100 is monitoring for a voice signal. The auto voice trigger 200 may help determine whether a signal received through some resonator microphones from the resonator microphone array 100 with different frequency bandwidths is a voice signal. When the received signal by the auto voice trigger 200 is determined to be a voice signal, the controller 300 may wake up (i.e., exit sleep mode and enter full power mode) and control a whole system to receive and analyze a wideband signal.

Each resonator microphone in the resonator microphone array 100 may be a narrowband microphone capable of receiving a narrowband signal. According to an aspect of an exemplary embodiment, for example, each resonator microphone may be a resonator microphone capable of receiving a signal of a specific frequency bandwidth.

A sampling frequency of a generally used microphone may be about 44100 Hz. However, a frequency band that mainly includes energy of a human voice may be below about 4000 Hz, a pitch (basic sound) of the human voice may range from about 100 Hz to about 600 Hz, and a formant (valid harmonic components) of the human voice may range from about 100 Hz to about 5000 Hz.

Although it may be necessary to precisely analyze high frequency band components and extract a valid specific component feature in order to increase the accuracy of voice recognition or speaker recognition, an auto voice trigger may sufficiently determine whether a signal received through a microphone is a human voice with frequency components below about 4000 Hz, or further narrowly about 2000 Hz.

In the auto voice trigger method according to an aspect of an exemplary embodiment, the resonator microphone array 100 may receive and analyze only about 10,000 (at least 4000-5000) pieces of data (e.g., data points) or less per second in real time and determine whether the data is a voice signal. Meanwhile, when the wideband microphone 500 is used in a voice trigger, the wideband microphone 500 may receive and analyze 40,000-50,000 pieces of data per second in real time and determine whether the data is a voice signal.

In this regard, the wideband microphone 500 may be a microphone capable of receiving a frequency band signal of approximately 0-44,100 Hz. The resonator microphone may be a microphone capable of receiving a signal of a specific frequency bandwidth. A resonator microphone array may use several resonator microphones with different specific frequency bandwidths. For example, an array of five resonator microphones with frequency bandwidths of 0-10,000 Hz, 10,000-20,000 Hz, 20,000-30,000 Hz, 30,000-40,000 Hz, and 40,000-50,000 Hz may receive all signals that may be received by an existing wideband microphone.

According to an aspect of an exemplary embodiment, the resonator microphone array 100 may include five or more resonator microphones (e.g., ten through twenty resonator microphones or twenty or more resonator microphones). A wideband frequency range of interest may be divided into, for example, P1 regions, and P1 resonator microphones with frequency bandwidths corresponding to the divided frequency ranges may be arranged, and thus, the entire wideband frequency range of interest may be covered.

The auto voice trigger 300 may determine whether the signal received through some resonator microphones from among the resonator microphone array 100 is the voice signal. For example, when the number of resonator microphones in the resonator microphone array 100 is P1 and the number of resonator microphones used to determine the voice signal is P2, a number of resonator microphones used to determine the voice signal satisfies a condition P2<P1, wherein P2 is equal to or greater than 1.

Figure 3A:
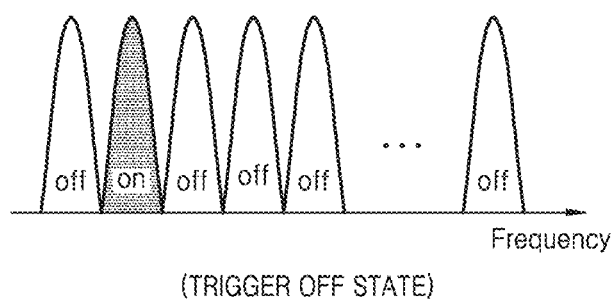
FIG. 3A illustrates a trigger off state with respect to a resonator microphone array consisting of a plurality of resonator microphones with different frequency bandwidths, only one resonator microphone being turned on in order to determine a voice signal while an auto voice trigger operates, according to an embodiment.
Figure 3B:
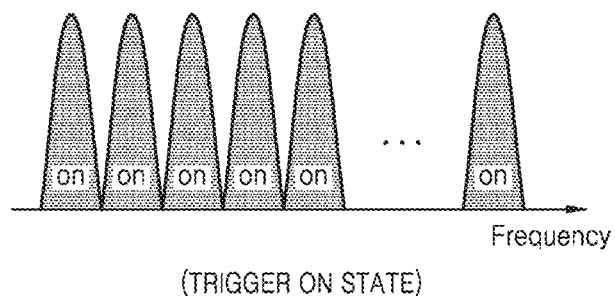
FIG. 3B illustrates a trigger on state with respect to a resonator microphone array consisting of a plurality of resonator microphones with different frequency bandwidths, in which when a received signal is determined as a voice signal while an auto voice trigger operates, a plurality of resonator microphones are turned on in order to analyze a received wideband signal, according to an embodiment.

When the resonator microphone array 100 is arranged in an order of a frequency bandwidth, the plurality of resonator microphones may have frequency bandwidth layouts as shown in FIGS. 3A and 3B. In FIGS. 3A and 3B, frequency bandwidths may respectively correspond to the resonator microphones.

As shown in FIG. 3A, at least one resonator microphone (with a frequency bandwidth in an ON state) may be used to determine the voice signal. In this regard, a frequency bandwidth of the at least one resonator microphone used to determine the voice signal may be located in a voice signal band.

FIGS. 3A and 3B illustrate layouts of the plurality of resonator microphones in the resonator microphone array 100 with different frequency bandwidths according to a frequency band. FIG. 3A illustrates a trigger OFF state with respect to the plurality of resonator microphone arrangements 100 with different frequency bandwidths, in which only one resonator microphone is turned on in order to determine a voice signal while the auto voice trigger 200 operates. FIG. 3B illustrates a trigger ON state with respect to the resonator microphone array 100 with different frequency bandwidths, in which when a received signal is determined to be a voice signal while the auto voice trigger 200 operates, a plurality of resonator microphones are turned on in order to analyze a received wideband signal. When the received signal is determined to be the voice signal while the auto voice trigger 200 operates, an operation of waking up a whole system (e.g., a memory for storing data, a main board for computing data, a processor, etc.) and analyzing the signal may start.

When the auto voice trigger 200 determines that the received signal is the voice signal, the controller 300 may control an audio analyzer to wake up the whole system and receive and analyze the wideband signal. In this regard, as shown in FIG. 1, when the wideband signal is received and analyzed by using the resonator microphone array 100, as shown in FIG. 3B, all of the plurality of resonator microphones may be controlled to be in an ON state. Also, as shown in FIG. 2, when the wideband signal is received and analyzed by the wideband microphone 500, the wideband microphone 500 may be controlled to be in an ON state.

As shown in FIGS. 1 and 2, the trigger OFF state indicates that the auto voice trigger 200 has determined that the received signal is not a voice signal, and thus the auto voice trigger 200 may perform a voice signal determining operation until the received signal is determined to be a voice signal.

FIGS. 3A and 3B illustrate frequency bands of resonator microphones used in an auto voice trigger method during a voice trigger ON/OFF state according to an exemplary embodiment. If only a signal with a specific band, for example, from about 1500 Hz to about 2000 Hz, is received and determined to be a voice signal, a signal of a wideband frequency may be received and analyzed.

As described above, when only at least one resonator microphone capable of determining whether a signal is a voice signal from among the plurality of resonator microphones in the resonator microphone array 100 is always turned on, the sampling frequency or clock frequency of a signal may be reduced compared to a case where a wideband microphone is always turned on (e.g., a resonator microphone: less than 10 kHz, a wideband microphone: 44.1 kHz), and the number of pieces of data that needs to be received and processed within the same period of time may be reduced. Thus, the resonator microphone may be characterized by less power consumption and computational amount, and be used as an auto voice trigger having a performance similar to an existing solution.

In particular, according to an auto voice trigger method according to an aspect of an exemplary embodiment, a computational amount and a computational time may be reduced compared to a method of analyzing a signal for each frequency band by receiving data through a wideband microphone and applying fast Fourier transfer (FFT) and a band pass filter for extracting a signal of a specific frequency band.

Figure 4:
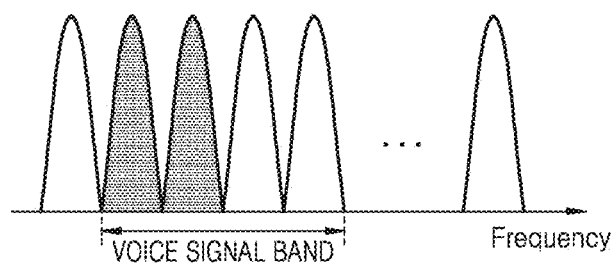
FIG. 4 illustrates a method of determining a voice signal by using two or more adjacent resonator microphones of a voice signal band according to an embodiment.
Figure 5:
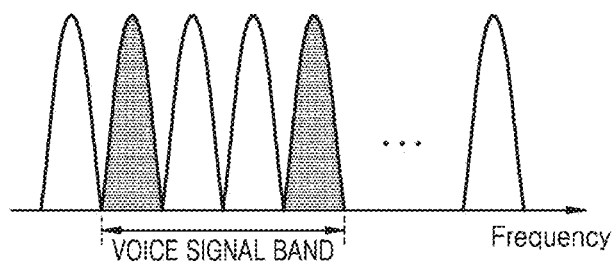
FIG. 5 illustrates a method of determining a voice signal by comparing values of signals received through two or more resonator microphones of a voice signal band that are not adjacent to each other according to an embodiment.
Figure 6:
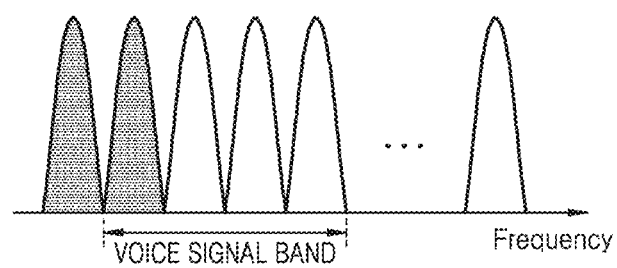
FIG. 6 illustrates a method of determining a voice signal by using a resonator microphone within a voice signal band and a resonator microphone of a region beyond the voice signal band according to an embodiment.

FIG. 3A illustrates an example of using a single resonator microphone operating in a voice signal band, from among the plurality of resonator microphones in the resonator microphone array 100, to determine the voice signal. As shown in FIGS. 4 through 6, two or more resonator microphones operating in a voice signal band may be used to determine a voice signal.

For example, as shown in FIGS. 4 and 5, two or more resonator microphones with frequency bandwidths within a voice signal band may be used to determine a voice signal. FIGS. 4 and 5 illustrate cases where two resonator microphones (with frequency bandwidths indicated by hatched lines) with frequency bandwidths within a voice signal band may be used to determine a voice signal. Three or more resonator microphones with frequency bandwidths within a voice signal band may also be used to determine a voice signal.

In this regard, the two or more resonator microphones used to determine the voice signal may have adjacent frequency bandwidths as shown in FIG. 4. As shown in FIG. 5, when a plurality of resonator microphones are arranged in an order of frequency bandwidths, at least one resonator microphone with a different frequency bandwidth may be located between the two or more resonator microphones used to determine the voice signal.

FIG. 4 illustrates a method of determining a voice signal by using two or more adjacent resonator microphones operating in a voice signal band. As shown from analysis results of FIGS. 17A and 17B that will be described later, a voice signal and loud noise may be distinguished from each other by comparing values of signals received through the two or more resonator microphones. For example, when the voice signal is generated, the signals received through the two or more adjacent resonator microphones have high correlations, whereas when noise is generated, the received signals may have low correlations. Thus, the voice signal may be determined by determining whether comparison values (correlations, a sum of energy, a difference of energy, etc.) of signals received through two resonator microphones exceed a threshold.

FIG. 5 illustrates a method of distinguishing a voice signal from noise by comparing values of signals received through two or more resonator microphones of a voice signal band that are not adjacent to each other. As shown from analysis results of FIGS. 18A and 18B that will be described later, a voice signal and loud noise may be distinguished from each other by comparing values of signals received through the two or more resonator microphones. In this regard, frequency bands of the two resonator microphones may be selected as frequency bands having a harmonic relationship in the voice signal. In this case, accuracy of determining whether the voice signal is generated may be further increased.

That is, values of received signals may be compared by designating one of the two resonator microphones to have a frequency band of a pitch occurrence period, and another one to have a frequency band including a pitch harmonic (or a formant band). In this case, when the voice signal is generated, the received signals may have high correlations, a sum of the signals may increase, and signal generation locations for each time frame may be similar, whereas when a noise signal is generated, the received signals may have low correlations, the sum of the signals may be uniform, and signal generation locations for each time frame may be random. By comparing the signals described above, an auto voice trigger may be more resilient to noise and thus exhibits more robust performance in a high-noise environment.

As shown in FIG. 6, resonator microphones used to determine a voice signal may include at least one resonator microphone within a voice signal band and at least one resonator microphone with a frequency bandwidth beyond the voice signal band. FIG. 6 illustrates a case where one resonator microphone located in a region beyond the voice signal band is further used to determine the voice signal compared to FIG. 3A. Using an additional resonator microphone located in the region beyond the voice signal band to determine the voice signal may be applied to a case where two or more resonator microphones operating in the voice signal band are used to determine the voice signal as shown in FIGS. 4 and 5.

As shown in FIG. 6, for an auto voice trigger, one or more resonator microphone with a voice frequency band may be used and a resonator microphone with a non-voice frequency band may be additionally used. As described above, when a resonator microphone operating in a voice band and a resonator microphone operating in a non-voice band are used to determine the voice signal, as shown from analysis results of FIGS. 16A and 16B that will be described later, the voice signal and loud noise may be distinguished from each other based on comparison values of signals received through two or more resonator microphones such as a signal to noise ratio (SNR) or correlations by comparing values of the signals.

Figure 7:
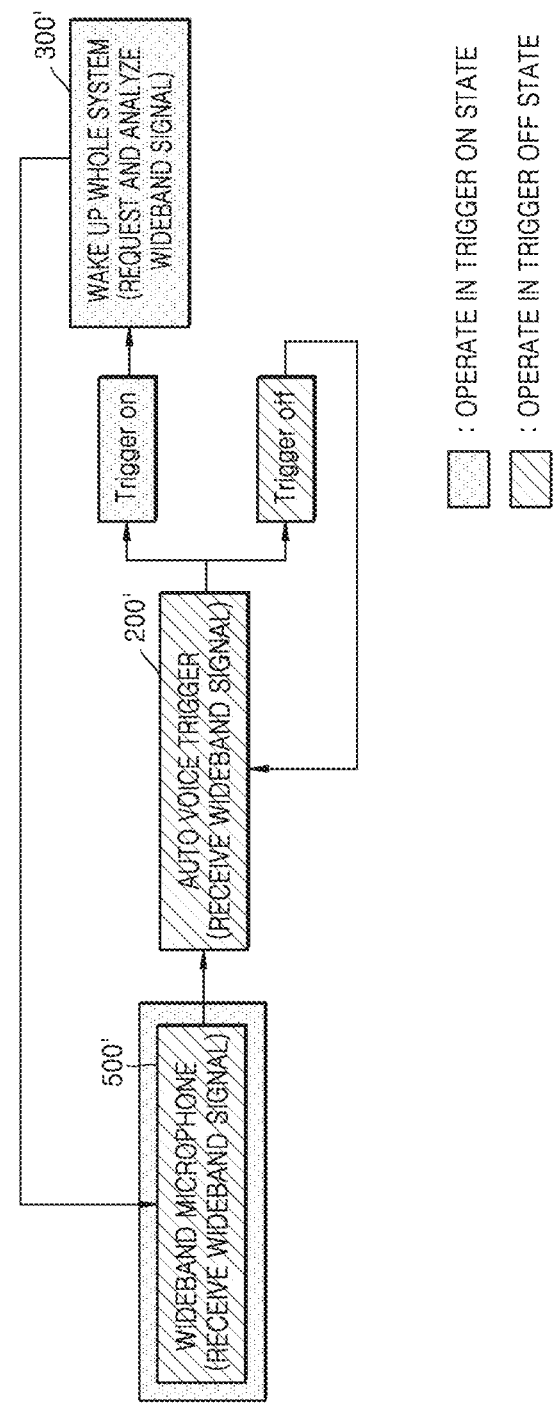
FIG. 7 illustrates a comparison example of an audio analyzer used in an existing auto voice trigger.

FIG. 7 illustrates a comparison example of an audio analyzer used in an existing auto voice trigger 200'.

As shown in FIG. 7, according to an existing auto voice trigger method, the auto voice trigger 200' may analyze a wideband signal received by a wideband microphone 500' and may determine the wideband signal as a voice signal. In a trigger on state, a controller 300' may wake up a whole system (e.g., a memory for storing data, a main board for computing data, etc.) and analyze a signal.

Figure 8A:
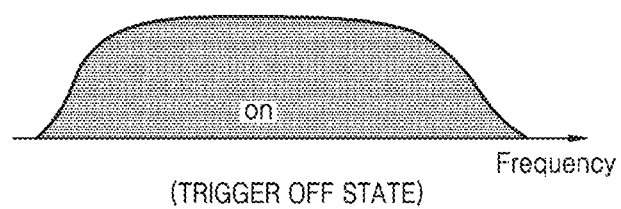
FIGS. 8A and 8B respectively illustrate use frequency bands of voice trigger on/off states in an existing auto voice trigger method.
Figure 8B:
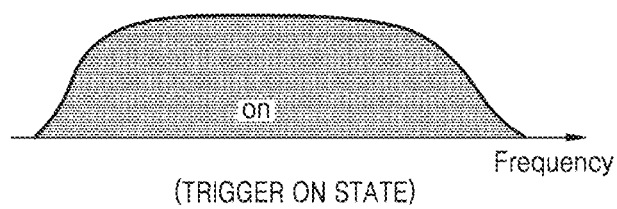

FIGS. 8A and 8B respectively illustrate use frequency bands of voice trigger ON/OFF states in an existing auto voice trigger method. As shown in FIGS. 8A and 8B, according to the existing auto voice trigger method, since a voice signal is always determined by receiving a signal of a wideband frequency (0-44,100 Hz), much greater power consumption and computational amount are required compared to the present disclosure.

Figure 9:
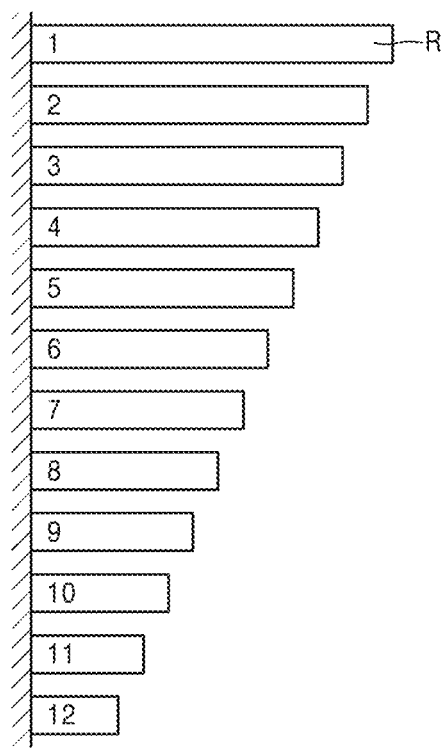
FIG. 9 illustrates an example of a resonator microphone array used in an auto voice trigger method according to an embodiment.

FIG. 9 illustrates an example of a resonator microphone array applied to an auto voice trigger method according to an exemplary embodiment. In FIG. 9, the number of the resonator microphones R is 12.

FIG. 9 illustrates a case where the resonator microphones R are arranged in an order of center frequencies. A center frequency arrangement order may be modified in various ways.

The resonator microphones R may have a uniform arrangement period p, a center frequency interval Δf, and different center frequencies between adjacent resonator microphones. Also, frequency bandwidths of the adjacent resonator microphones R may be apart from each other.

Figure 10A:
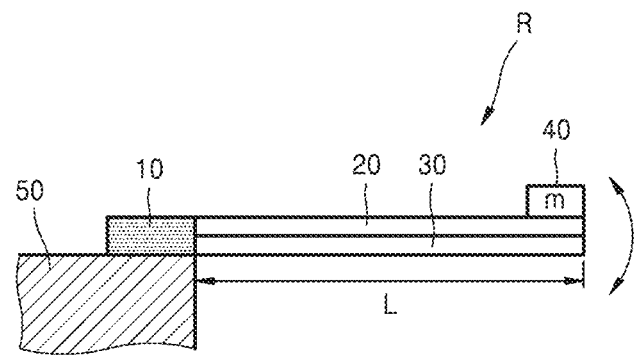
FIGS. 10A and 10B are cross-sectional views of a single resonator microphone according to an embodiment.
Figure 10B:
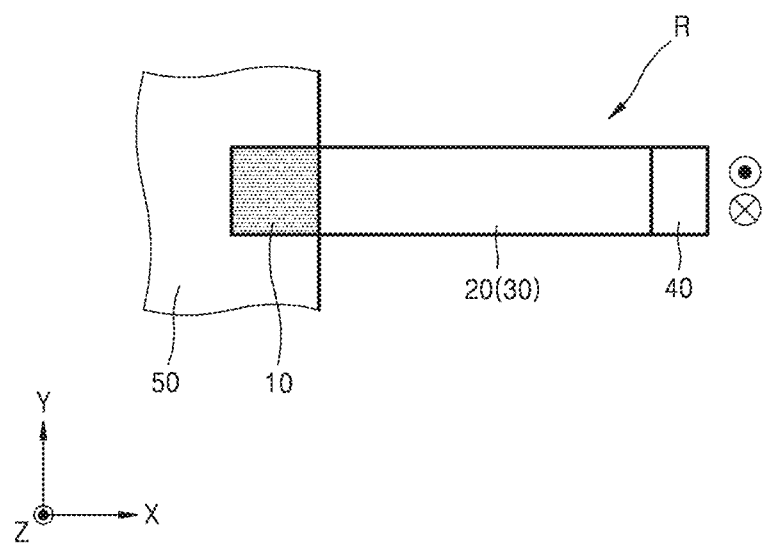
Figure 10C:
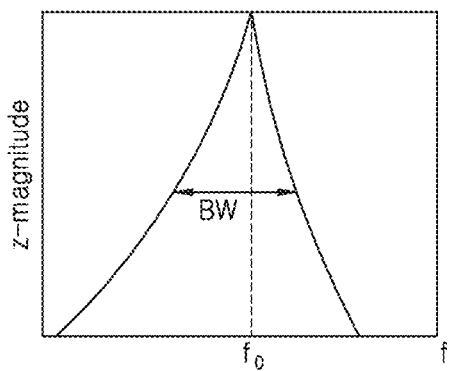
FIG. 10C is a graph of a frequency response characteristic of the single resonator microphone of FIGS. 10A and 10B according to an embodiment.

FIGS. 10A and 10B are cross-sectional views of a single resonator microphone R. FIG. 10C is a graph of a frequency response characteristic of the resonator microphone R of FIGS. 10A and 10B.

The plurality of resonator microphones R may be arranged in an array in a support substrate 50. In this regard, one end of each of the plurality of resonator microphones R with different frequency bandwidths may be fixed to the support substrate 50.

As shown in FIGS. 10A and 10B, the resonator microphone R may include a fixer 10 fixed to the support substrate 50, a driver 30 driven in response to a signal, and a sensor 20 sensing a movement of the driver 30. The resonator microphone R may further include a mass body 40 (e.g., a weight) for providing a predetermined mass m to the driver 30.

A through hole TH may be formed in the support substrate 50 and may face the driver 30 of each of the plurality of resonator microphones R. The through hole TH may provide a space in which the driver 30 vibrates by an external force and is not specially limited to a shape or a size as long as this is satisfied. The support substrate 50 may include various materials such as a silicon substrate.

The plurality of resonator microphones R may be planarly arranged by not overlapping with each other. That is, the plurality of resonator microphones R in their entirety may be simultaneously exposed to an input path of a physical signal. An arrangement trajectory of the fixers 10 of the plurality of resonator microphones R may be formed along a cross-sectional shape of the through hole TH. The through hole TH may have a circular shape but the present disclosure is not limited thereto. The through hole TH may have a polygonal shape or various closed curve shapes.

For example, according to an aspect of an exemplary embodiment, the arrangement trajectory of the fixers 10 of the plurality of resonator microphones R may have a polygonal shape, circular shape, a closed curve shape, or a two-parallel straight line shape.

The driver 30 may include an elastic film. The elastic film may have a length L and a width W that are factors determining a resonance characteristic of the resonator microphone R, along with the mass m of the mass body 40. The elastic film may include a material such as silicon, metal, polymer, etc.

The sensor 20 may include a sensor layer sensing the movement of the driver 30. The sensor 20 may include, for example, a piezoelectric element. In this case, the sensor 20 may have a structure in which an electrode layer, a piezoelectric material layer, and an electrode layer are stacked. ZnO, SnO, PZT, ZnSnO₃, Polyvinylidene fluoride (PVDF), poly(vinylidene fluoride-trifluoroethylene) (P(VDF-TrFE)), AlN, or PMN-PT may be used as a piezoelectric material. The electrode layer may include a metallic material or various conductive materials.

Each of the resonator microphones R may have a width of several micrometers or less, a thickness of several micrometers or less, and a length of several millimeters or less. The resonator microphones R with such small sizes may be manufactured through a micro electro mechanical system (MEMS) process.

The resonator microphone R may vertically vibrate in a Z direction in response to an external signal. A displacement value z may be determined according to the following motion equation.

$$m\frac{d^2z}{dt^2} + c\frac{dz}{dt} + kz = F_0\cos\omega t$$

wherein, c denotes a damping coefficient, k denotes an elastic coefficient, and $F_0 \cos \omega t$ denotes a driving force and also indicates an action by a signal input to the resonator microphone R. A k value may be determined according to a property and a shape of the driver 30.

The resonator microphone R may exhibit a frequency response characteristic having a center frequency $f_0$ and a band width BW according to the motion equation as shown in FIG. 2C.

In this regard, the center frequency $f_0$ is as follows.

$$f_0 = \frac{1}{2\pi}\sqrt{\frac{k}{m}}$$

The bandwidth BW denotes a frequency bandwidth representing half of a frequency response value (z-magnitude) with respect to the center frequency $f_0$.

The resonator microphones R may be designed to have different center frequencies and may sense a frequency of a certain band with respect to the center frequency $f_0$.

Figure 11:
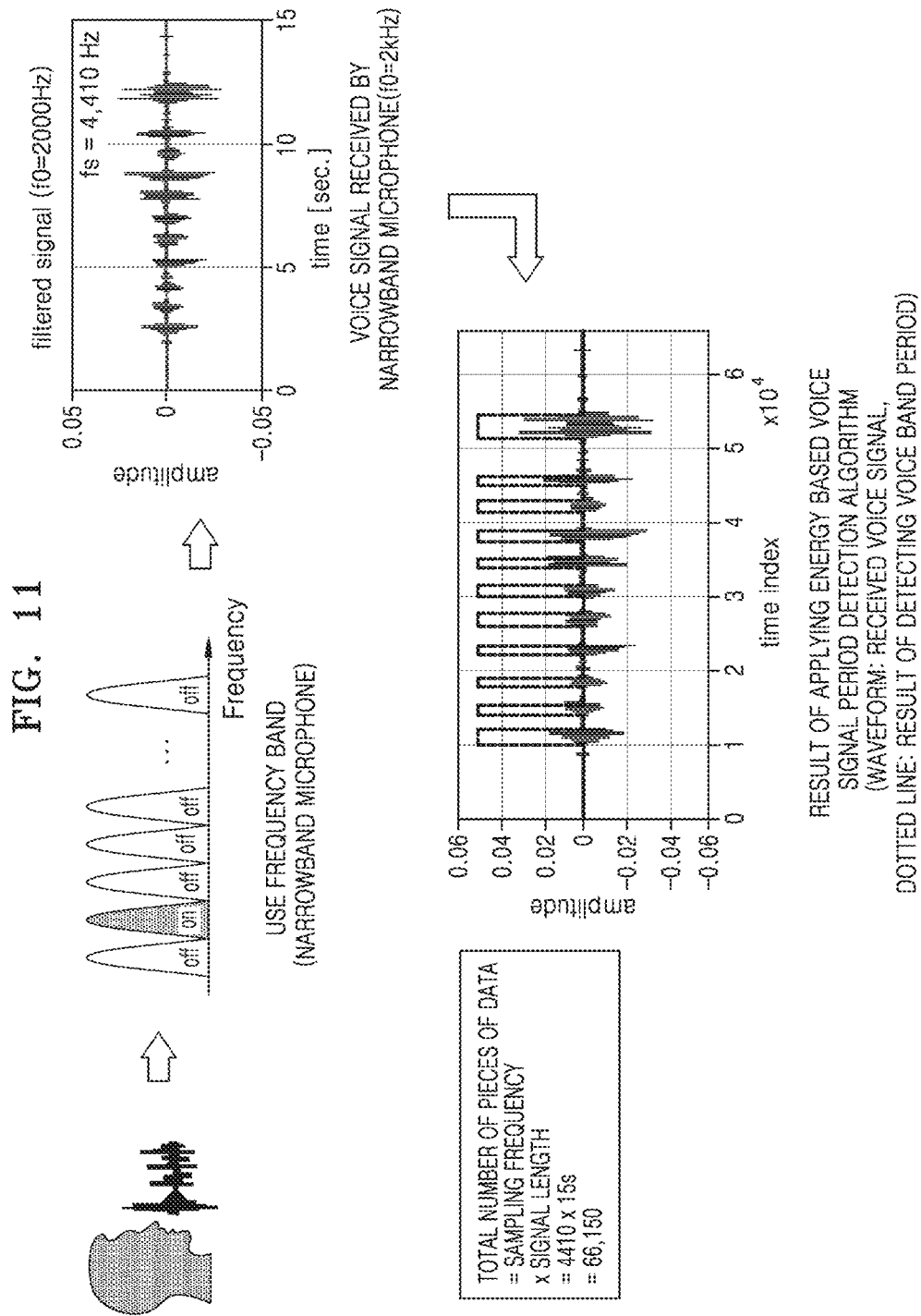
FIG. 11 illustrates an example of an auto voice trigger analysis result obtained by using a resonator microphone array according to an embodiment.
Figure 12:
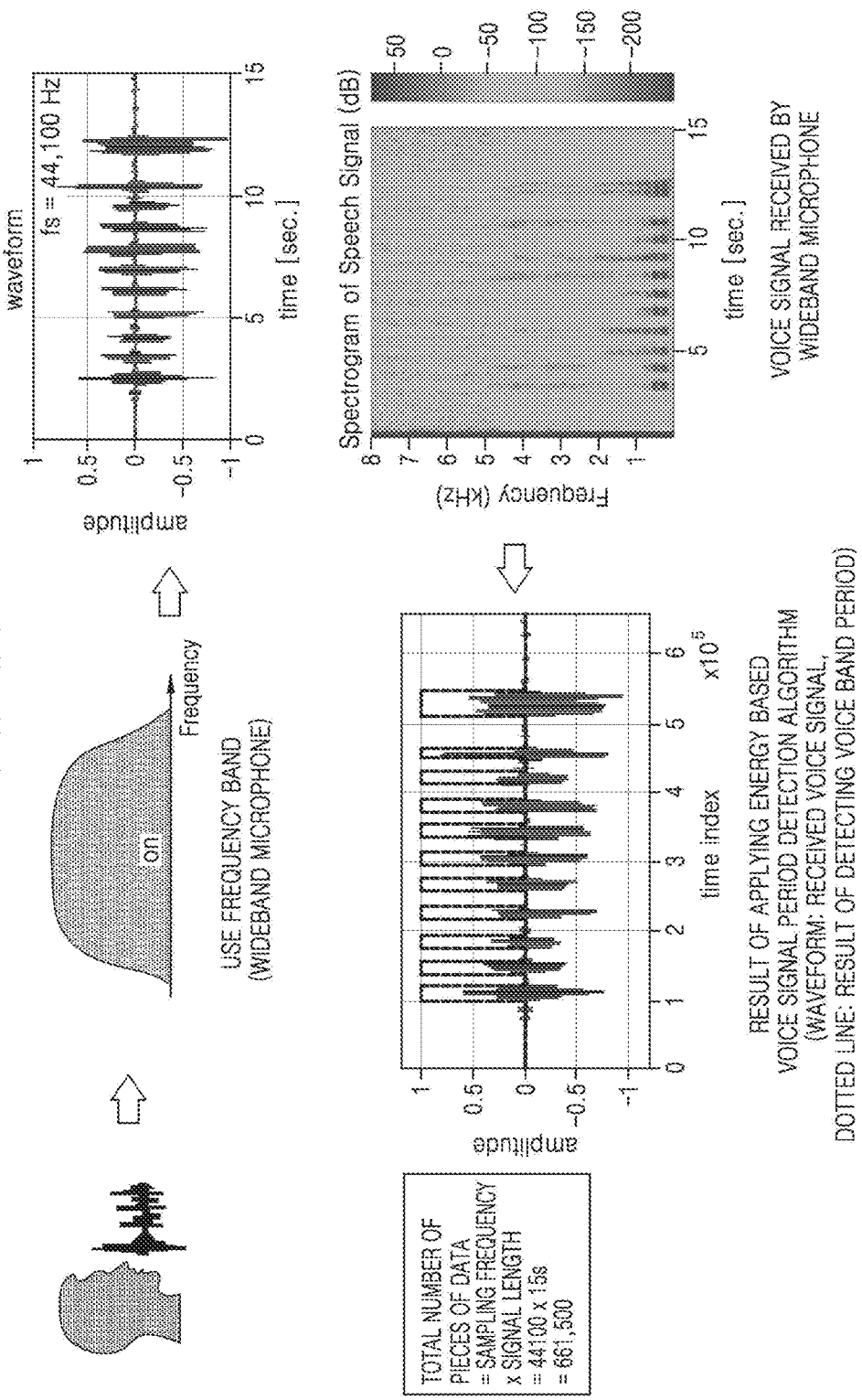
FIG. 12 illustrates a comparison example of an auto voice trigger analysis result based on an existing wideband microphone.

FIG. 11 illustrates an example of an auto voice trigger analysis result based on using the resonator microphone array 100 according to an embodiment. FIG. 12 illustrates a comparison example of an auto voice trigger analysis result based on using the existing wideband microphone. FIGS. 11 and 12 illustrate a case of receiving only a voice signal. In FIG. 11, the resonator microphone array 100 is illustrated as a group of narrowband microphones in comparison to the wideband microphone of FIG. 12.

Referring to FIG. 11, a narrowband microphone (about $f_0$=2 kHz) used to determine a voice signal may sense a human voice signal in a use frequency band, receive the voice signal, detect the received voice signal by applying an energy-based voice signal frequency detection algorithm, and detect a voice band period as indicated in a dotted line of a lower graph of FIG. 11.

The total number of pieces of data Data to be analyzed may be presented as a multiplication (i.e., product) of a sampling frequency and a signal length. When the sampling frequency of the narrowband microphone is about 4,410 Hz and the signal length is about 15 seconds, the total number of pieces of data Data to be analyzed may be may be about 66,150.

Referring to FIG. 12 according to the comparison example, a wideband microphone may sense a human voice signal in a use frequency band, detect the received voice signal by applying the energy based voice signal period detection algorithm, and detect a voice band period as indicated in a dotted line of a lower graph of FIG. 12.

In this regard, since the sampling frequency of the wideband microphone is about 44,100 Hz, when the signal length is about 15 seconds, the total number of pieces of data Data to be analyzed may be may be about 661,500.

The sampling frequency of the narrowband microphone of 4,410 Hz may correspond to sampling of only a signal of a frequency band of 2 kHz in a spectrogram of the voice signal received in the wideband microphone of FIG. 12.

When only the voice signal is received, the voice trigger method using the narrowband microphone according to an embodiment may be substantially the same as a method using the existing wideband microphone in a voice trigger result. The number of pieces of data used to receive and analyze the data may be reduced by $\frac{1}{10}$ in the voice trigger method according to an embodiment compared to the method using the existing wideband microphone, thereby reducing a computational amount and power consumption.

FIG. 13 illustrates a power consumption comparison when a sampling frequency is fs=4.41 kHz according to the embodiment of FIG. 11 and a sampling frequency is fs=44.1 kHz according to the existing method of FIG. 12.

As shown in FIG. 13, except for a signal received by a resonator microphone, when the same signal detection algorithm as applied in the case of using the existing wideband microphone, although a voice trigger result is the same according to the existing method and the embodiment of FIG. 11, since the number of pieces of data used to receive and analyze the data is reduced by $\frac{1}{10}$ according to the exemplary embodiment, the power consumption according to the existing method is about 24.2 mW, whereas the power consumption according to the exemplary embodiment of FIG. 11 is about 22.7 mW and thus is reduced.

In this regard, FIG. 13 merely illustrates a reduction of the power consumption according to the exemplary embodiment compared to the power consumption according to the existing method. However, the reduction of the power consumption according to the exemplary embodiment is not limited thereto. When a chip is constituted only for a resonator microphone, the power consumption according to the embodiment may be greatly reduced with respect to the example of FIG. 13.

Figure 14:
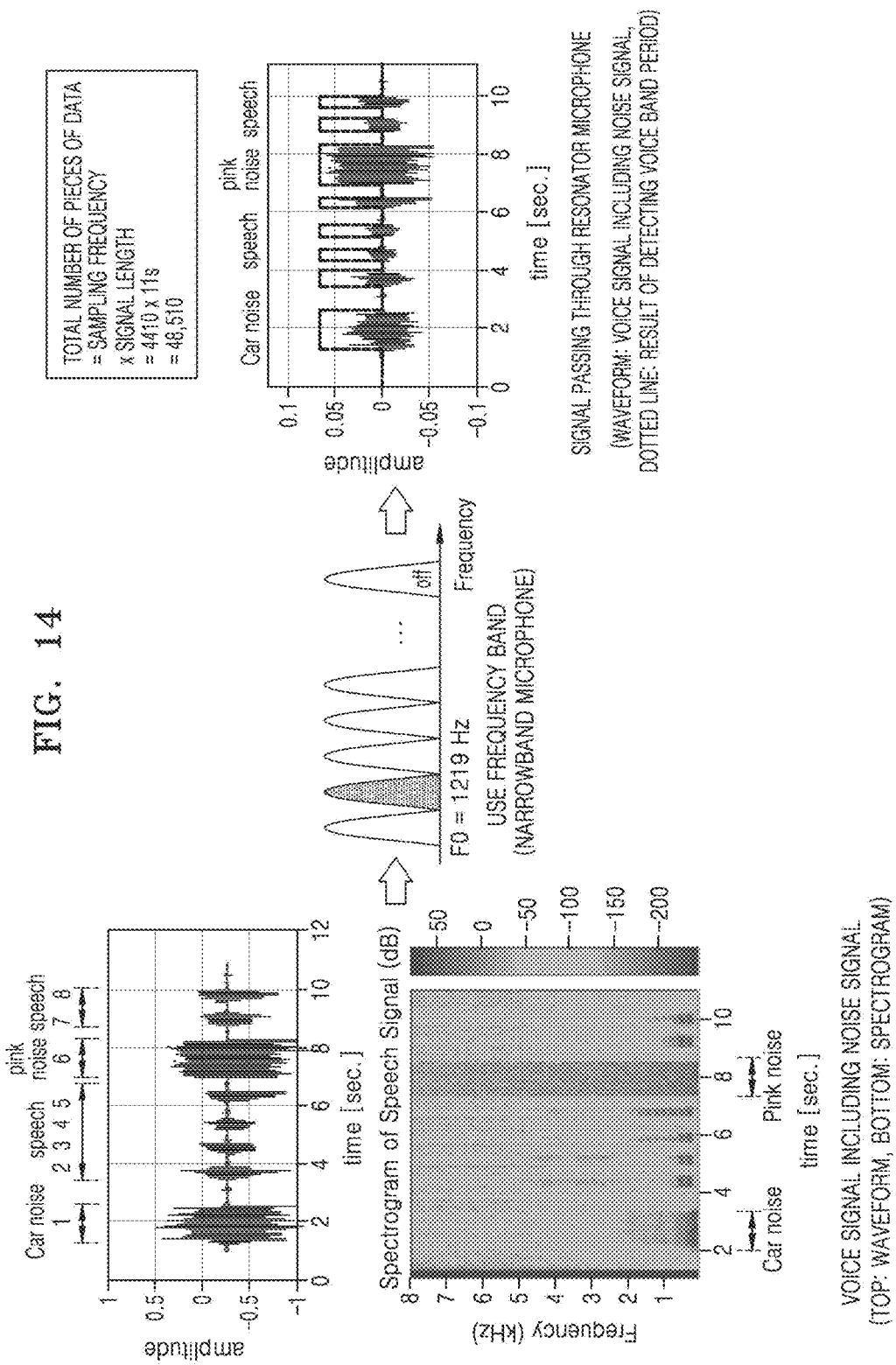
FIG. 14 illustrates another example of an auto voice trigger analysis result based on using a resonator microphone array according to an embodiment.
Figure 15:
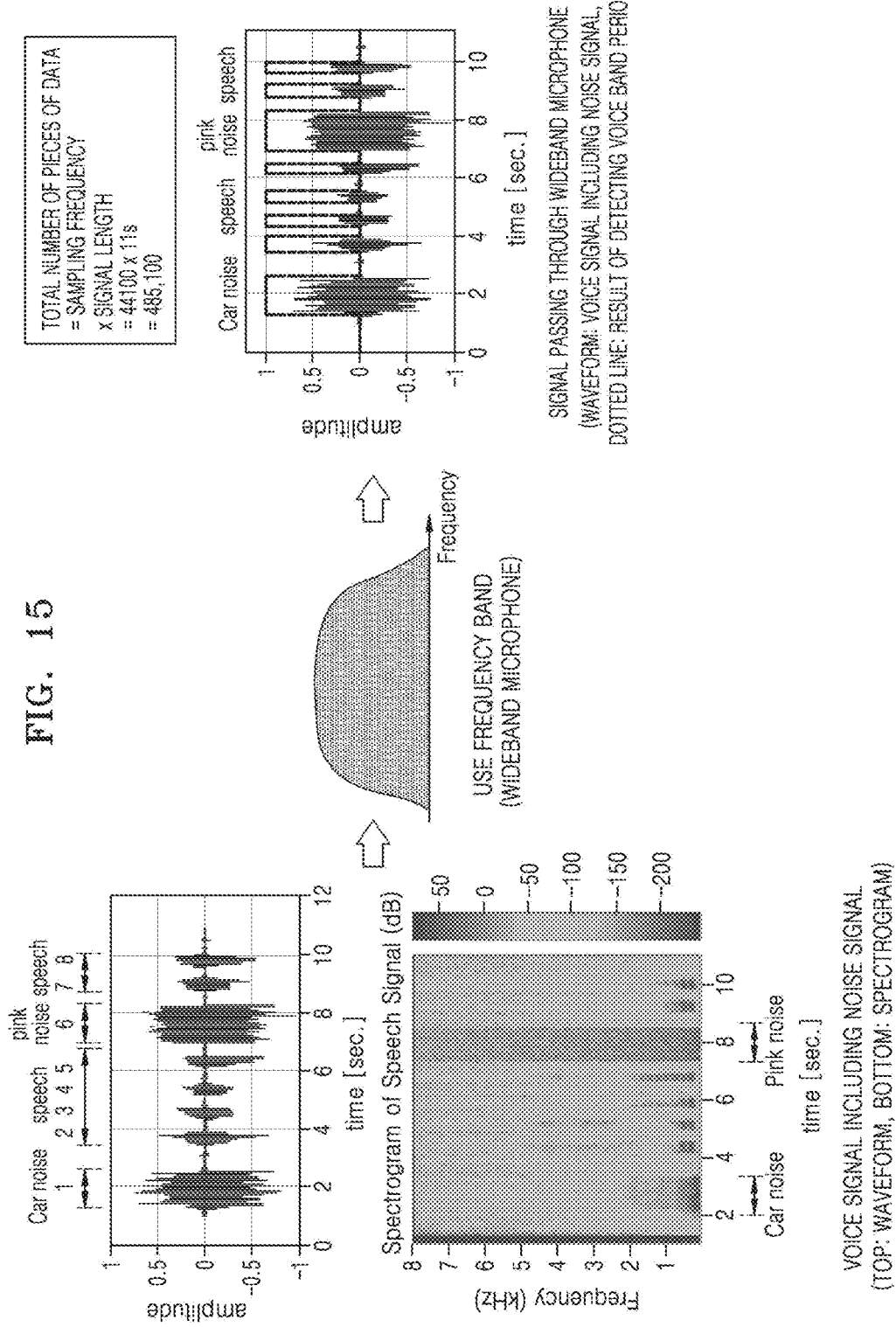
FIG. 15 illustrates a comparison example of an auto voice trigger analysis result using an existing wideband microphone.

FIG. 14 illustrates another example of an auto voice trigger analysis result based on using the resonator microphone array 100 according to an embodiment. FIG. 15 illustrates a comparison example of an auto voice trigger analysis result based on using the existing wideband microphone 500'. FIGS. 14 and 15 illustrate a case of receiving a noise signal as well as a voice signal. In FIG. 14, the resonator microphone array 100 is illustrated as a group of narrowband microphones in comparison to the wideband microphone of FIG. 15. In FIGS. 14 and 15, left waveforms and spectrograms are the same.

Referring to FIG. 14, a narrowband microphone ($f_0$=1,219 kHz) used to determine a voice signal in a use frequency band may receive the noise signal such as car noise, pink noise, etc. as well as the voice signal. When the signal passing through the narrowband microphone is detected by applying an energy-based voice signal period detection algorithm, a voice band period may be detected as expressed in a dotted line of a graph of the signal passing through the right resonator microphone of FIG. 14.

The total number of pieces of data to be analyzed may be presented as a multiplication (i.e., product) of a sampling frequency by a signal length. When the sampling frequency of the narrowband microphone is about 4,410 Hz and the signal length is about 11 seconds, the total number of pieces of data to be analyzed may be may be about 48,510.

Referring to FIG. 15 according to the comparison example, a wideband microphone used to determine a voice signal in a use frequency band may receive the noise signal such as car noise, pink noise, etc. as well as the voice signal. If the signal passing through the wideband microphone is detected by applying the energy based voice signal period detection algorithm, a voice band period may be detected as expressed in a dotted line of a graph of the signal passing through the right wideband microphone of FIG. 15.

Since the sampling frequency of the narrowband microphone is about 44,100 Hz and the signal length is about 11 seconds, the total number of pieces of data to be analyzed may be may be about 485,100.

The sampling frequency of the narrowband microphone of 4,410 Hz may correspond to sampling of only a signal of a frequency band of 1,219 kHz in a spectrogram of the voice signal received by the wideband microphone.

Figure 16A:
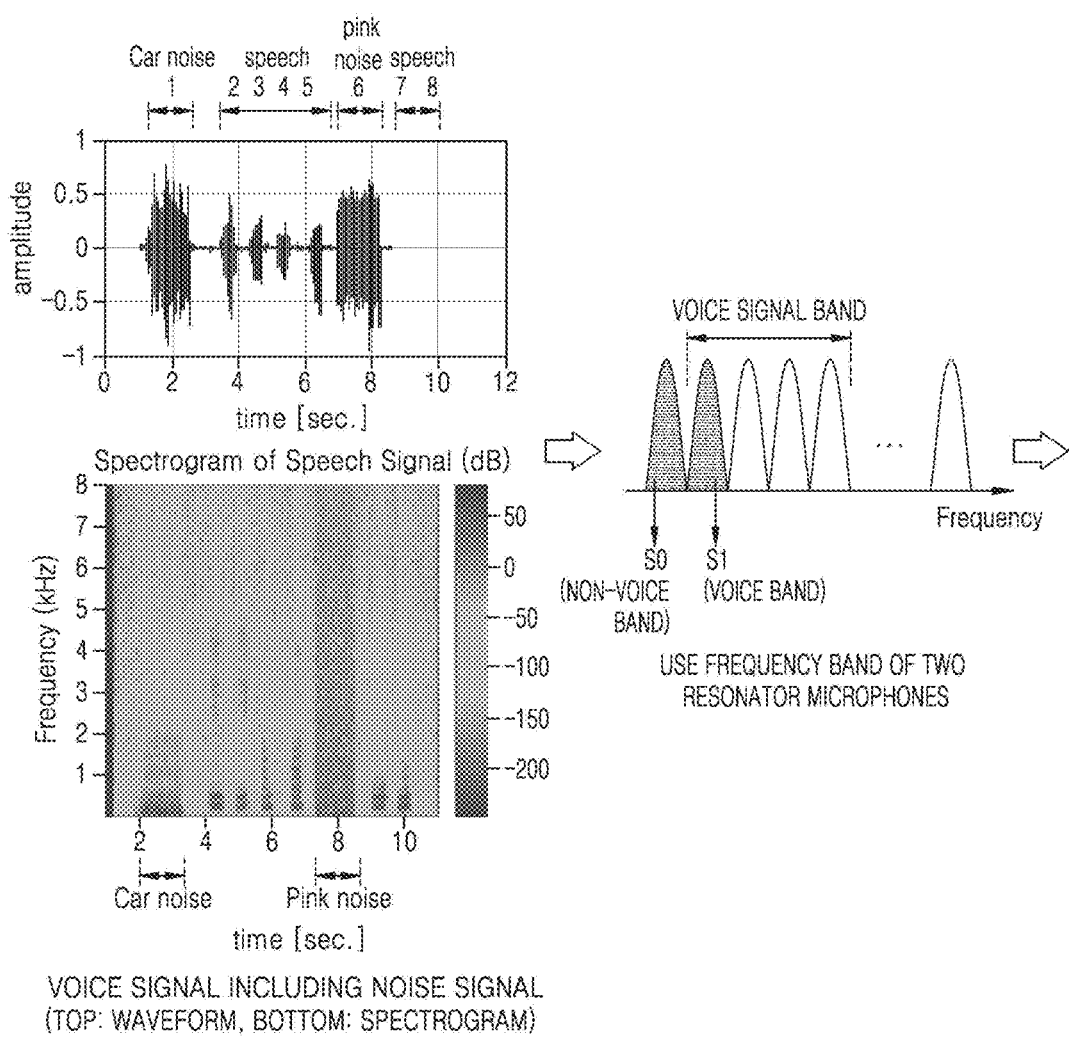
FIGS. 16A and 16B illustrate other example of an auto voice trigger analysis result using a resonator microphone array according to an embodiment.
Figure 16B:
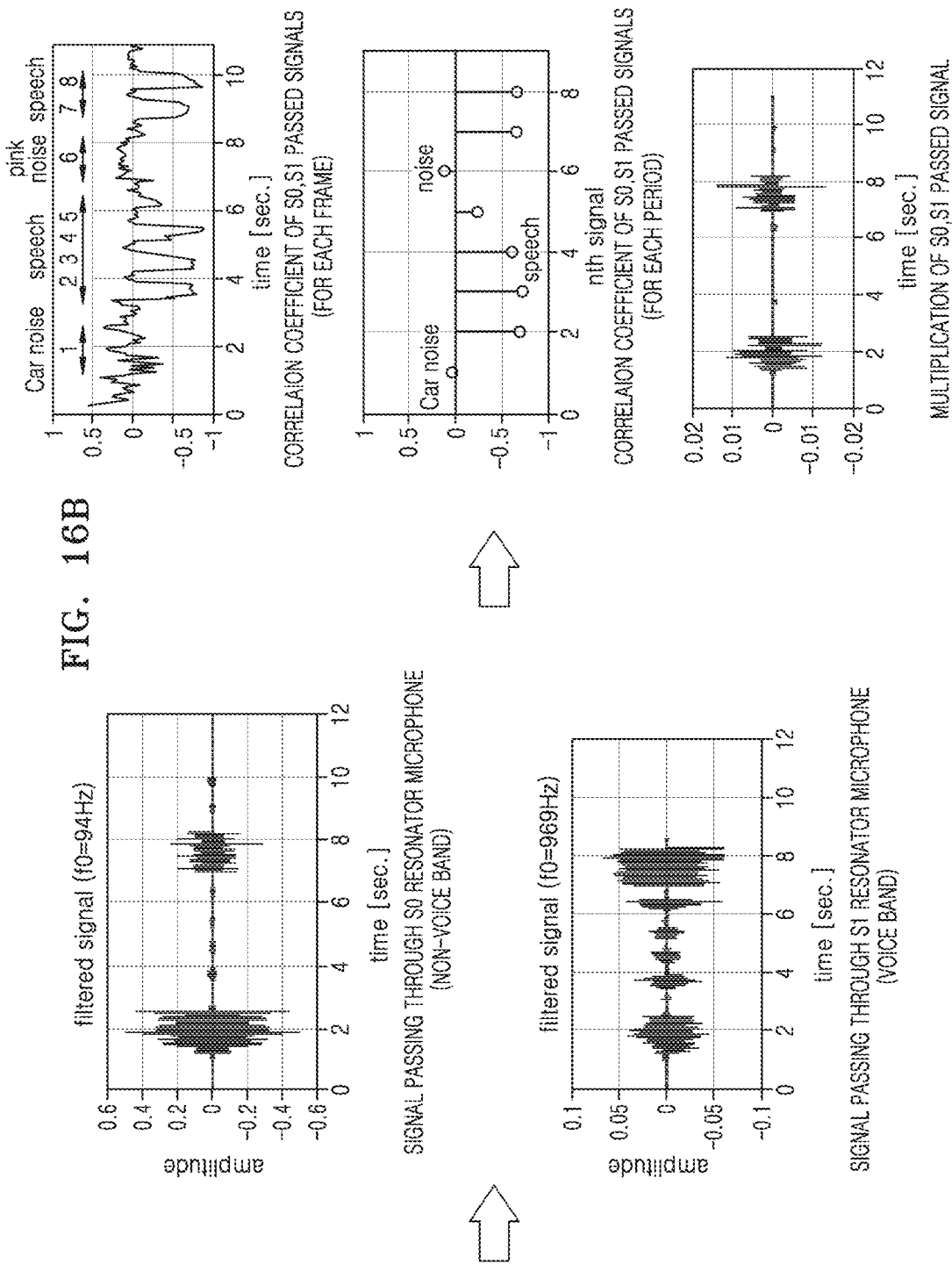

FIGS. 16A and 16B illustrate other example of an auto voice trigger analysis result based on using the plurality of resonator microphone arrangements 100 according to an embodiment. FIGS. 16A and 16B illustrate a case of receiving a noise signal as well as a voice signal. FIGS. 16A and 16B relate to an embodiment in which two resonator microphones with adjacent frequency bandwidths are used to determine a voice signal, wherein a resonator microphone S0 of a non-voice band and a resonator microphone S1 of a voice band are adjacent to each other.

Referring to FIG. 16A, when the plurality of resonator microphone arrangements 100 used to determine a voice signal in a use frequency band receive the noise signal such as car noise, pink noise, etc. as well as the voice signal, the resonator microphone S0 of the non-voice band and the resonator microphone S1 of the voice band that are used to determine the voice signal may receive the noise signal as well as the voice signal.

As shown in FIG. 16B, upon comparing a signal passing through the resonator microphone S0 of the non-voice band and a signal passing through the resonator microphone S1 of the voice band, as shown in a right graph of FIG. 16B, a correlation coefficient may be obtained for each frame and period, and a multiplication (i.e., product) of the signal passing through the resonator microphone S0 of the non-voice band and the signal passing through the resonator microphone S1 of the voice band may be obtained.

As described above, when two or more resonator microphones used to determine a voice signal have adjacent frequency bandwidths, the voice signal and a noise signal may be distinguished from each other by comparing values of signals received by the two or more resonator microphones. For example, when a comparison value exceeds a certain threshold, an operation, i.e. a trigger on state, of waking up a whole system (for example, a memory for storing data, a main board for computing data, etc.) and analyzing a signal may start.

As shown in FIGS. 16A and 16B, when the resonator microphone S0 of the non-voice band and the resonator microphone S1 of the voice band that are adjacent to each other are applied as the two or more resonator microphones used to determine a voice signal, performance of distinguishing voice and noise signals may be further enhanced, thereby accurately determining whether there is the voice signal even when the noise signal is received.

Figure 17A:
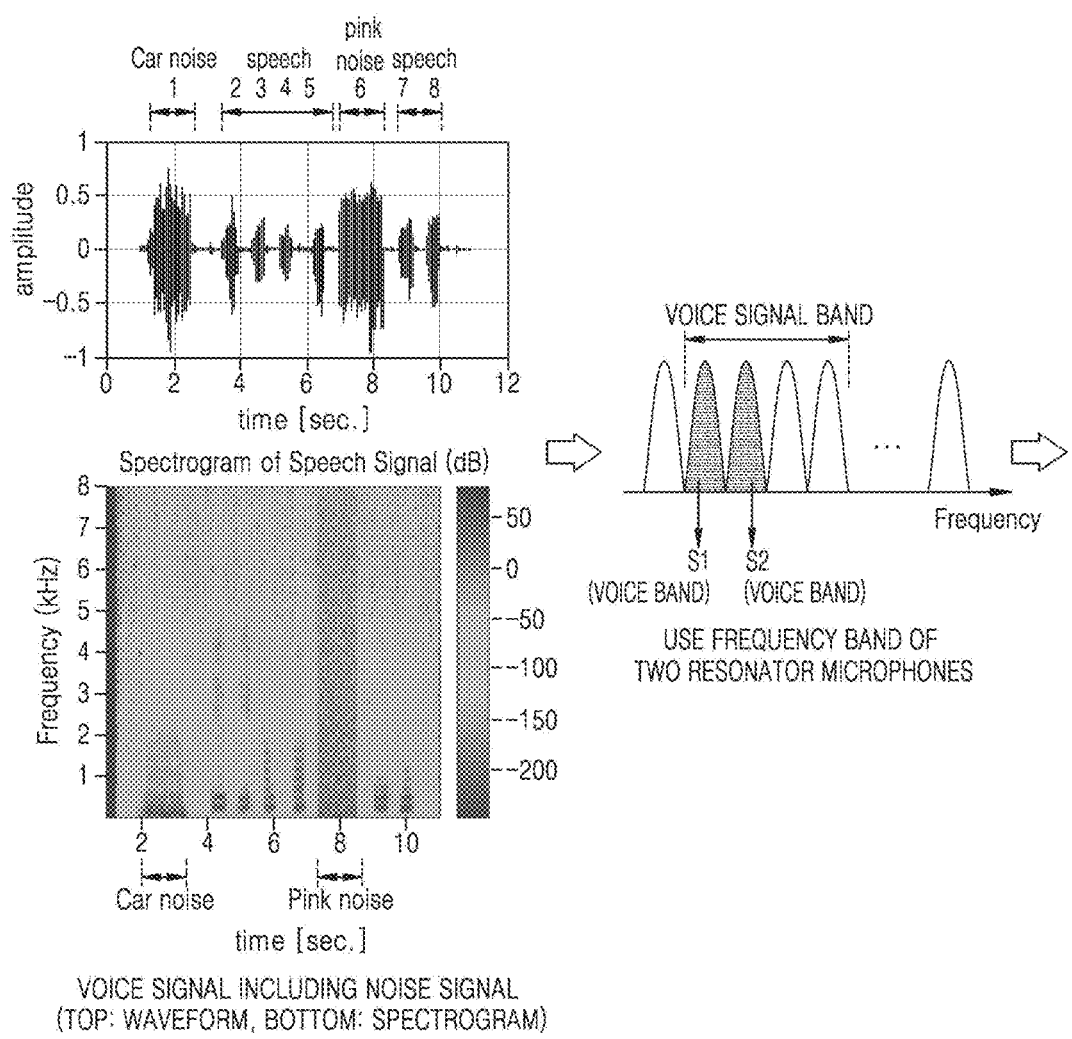
FIGS. 17A and 17B illustrate other example of an auto voice trigger analysis result using a resonator microphone array according to an embodiment.
Figure 17B:
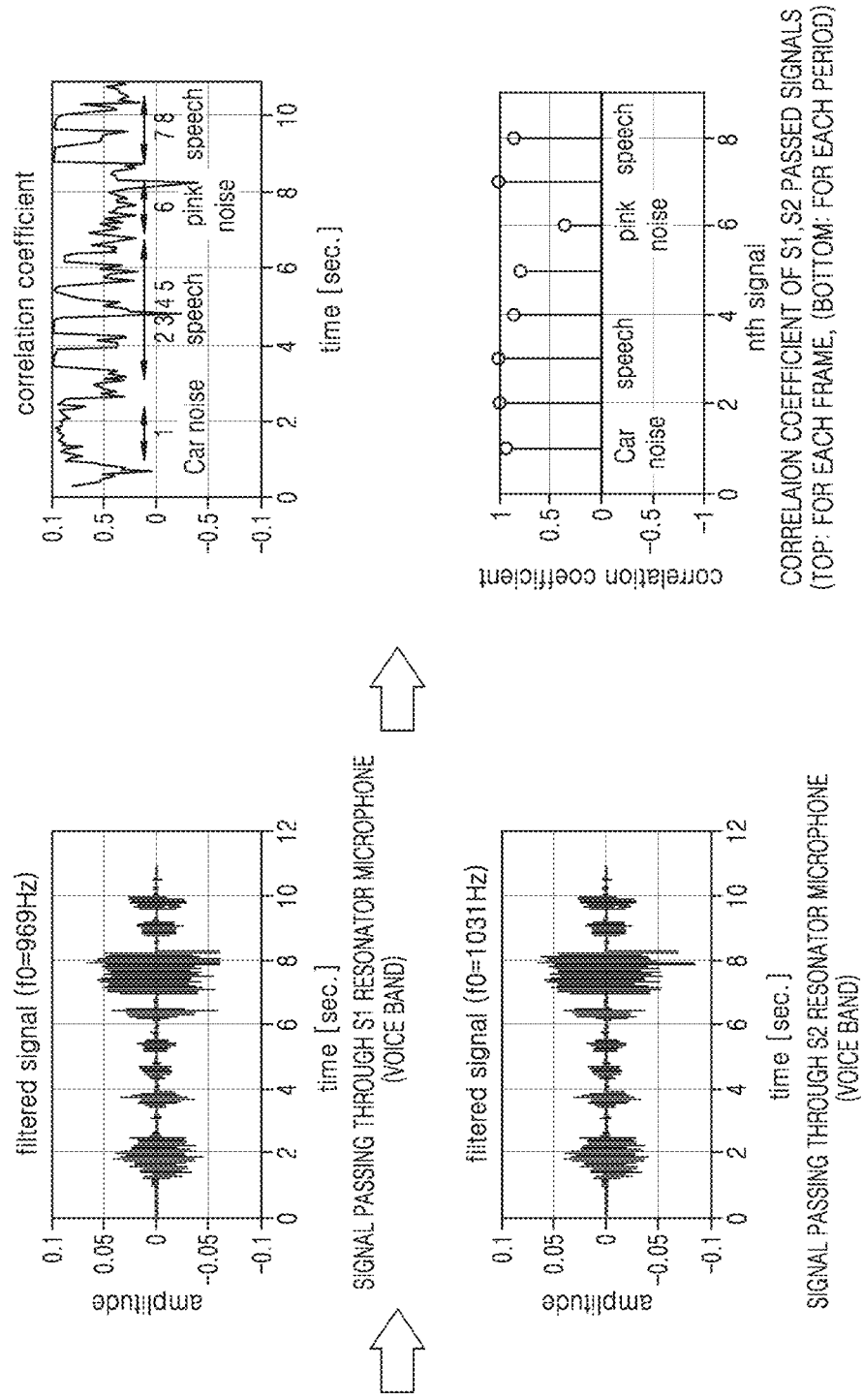

FIGS. 17A and 17B illustrate other examples of an auto voice trigger analysis result based on using the resonator microphone array 100 according to an embodiment. FIGS. 17A and 17B illustrate a case of receiving a noise signal as well as a voice signal. FIGS. 17A and 17B relate to an exemplary embodiment in which two resonator microphones with adjacent frequency bandwidths are used to determine a voice signal, wherein resonator microphones S1 and S2 of adjacent voice bands are used.

Referring to FIG. 17A, when the resonator microphone array 100 used to determine a voice signal in a use frequency band receive the noise signal such as car noise, pink noise, etc. as well as the voice signal, the resonator microphones S1 and S2 of the voice band may receive the noise signal as well as the voice signal.

As shown in FIG. 17B, upon comparing signals passing through the resonator microphones S1 and S2 of the voice band, as shown in a right graph of FIG. 17B, a correlation coefficient may be obtained for each frame and period.

As described above, when two or more resonator microphones used to determine a voice signal have adjacent frequency bandwidths, the voice signal and a noise signal may be distinguished by comparing values of signals received by the two or more resonator microphones. For example, when a comparison value exceeds a certain threshold, an operation, i.e. a trigger on state, of waking up a whole system (for example, a memory for storing data, a main board for computing data, etc.) and analyzing a signal may start.

As shown in FIGS. 17A and 17B, when the resonator microphones S1 and S2 of adjacent voice bands are applied as the two or more resonator microphones used to determine a voice signal, performance of distinguishing voice and noise signals may be enhanced, thereby accurately determining whether there is the voice signal even when the noise signal is received.

Figure 18A:
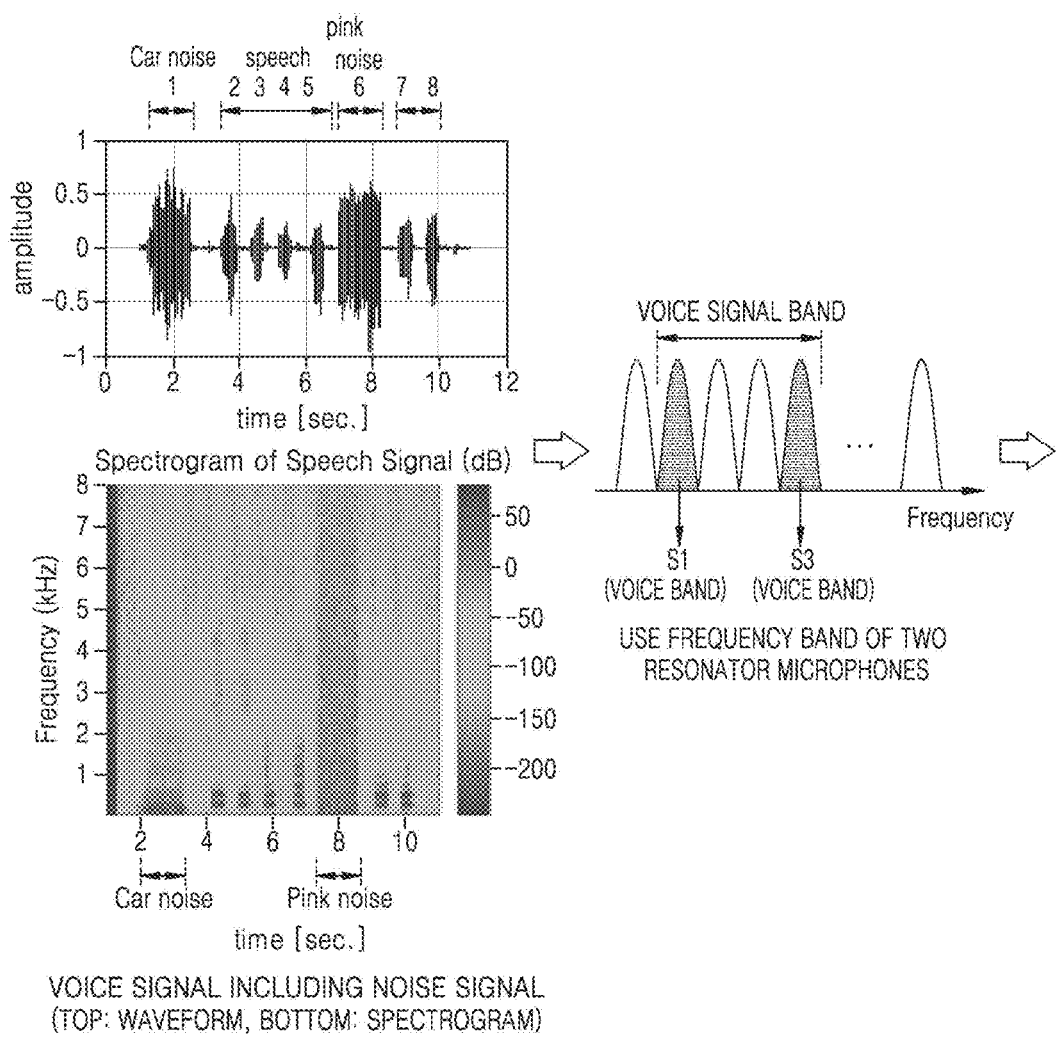
FIGS. 18A and 18B illustrate other example of an auto voice trigger analysis result using a resonator microphone array according to an embodiment.
Figure 18B:
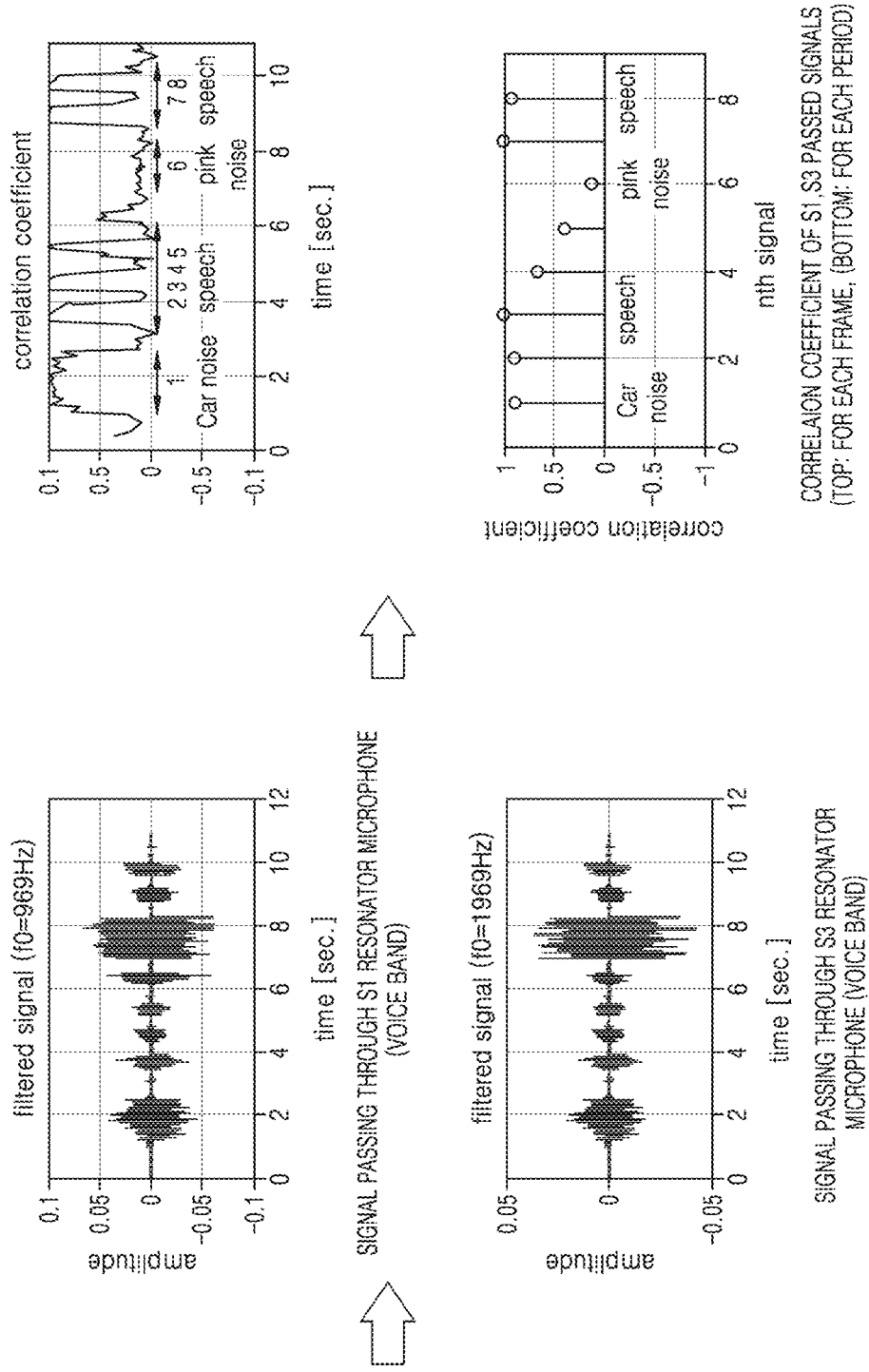

FIGS. 18A and 18B illustrate other example of an auto voice trigger analysis result based on using the plurality of resonator microphone arrangements 100 according to an embodiment. FIGS. 18A and 18B illustrate a case of receiving a noise signal as well as a voice signal. In FIGS. 18A and 18B, resonator microphones S1 and S3 operating in spaced voice bands are used to determine a voice signal.

Referring to FIG. 18A, when the resonator microphone array 100 used to determine a voice signal in a use frequency band receive the noise signal such as car noise, pink noise, etc. as well as the voice signal, the resonator microphones S1 and S3 of the voice band may receive the noise signal as well as the voice signal.

As shown in FIG. 18B, upon comparing signals passing through the resonator microphones S1 and S3 operating in the voice band, as shown in a right graph of FIG. 18B, a correlation coefficient may be obtained for each frame and period.

As described above, when two or more resonator microphones used to determine a voice signal have spaced frequency bandwidths, the voice signal and a noise signal may be distinguished from each other by comparing values of signals received by the two or more resonator microphones. For example, when a comparison value is greater than a certain threshold, an operation, i.e., a trigger on state, of waking up a whole system (for example, a memory for storing data, a main board for computing data, etc.) and analyzing a signal may start.

As shown in FIGS. 18A and 18B, when the resonator microphones S1 and S3 of spaced voice bands are used as the two or more resonator microphones used to determine a voice signal, the performance of distinguishing voice from noise signals may be enhanced, thereby accurately determining whether the voice signal exists even when the noise signal is received.

When an auto voice trigger method using a resonator microphone array according to various embodiments as described above is applied, a computational amount and a power consumption amount may be reduced compared to an existing voice trigger method applying the wideband microphone.

The auto voice trigger method according to various exemplary embodiments as described above and an audio analyzer employing the same may be utilized in situation recognition, voice recognition, speaker authentication, a voice secretary, or the like in cell phones, TVs, computers, home appliances, vehicles, or smart home environments.

According to the auto voice trigger method and the audio analyzer employing the same according to the exemplary embodiment, at least one resonator microphone tuned for a voice band from a resonator microphone array may be used to determine a voice signal, thereby reducing a computational amount and a power consumption amount and increasing accuracy of determination of the voice signal.

It should be understood that the embodiments described herein should be considered in a descriptive sense only and not for purposes of limitation. Descriptions of features or aspects within each embodiment should typically be considered as available for other similar features or aspects in other exemplary embodiments.

While one or more embodiments have been described with reference to the figures, it will be understood by those of ordinary skill in the art that various changes in form and details may be made therein without departing from the spirit and scope as defined by the following claims.

What is claimed is:

1. An auto voice trigger method comprising:
    receiving a signal by at least one resonator microphone included in an array of a plurality of resonator microphones with different frequency bandwidths;
    analyzing the received signal and determining whether the received signal is a voice signal; and
    in response to determining that the received signal is the voice signal, waking up a whole system to receive and analyze a wideband signal,
    wherein a number of the plurality of resonator microphones is P1, and a number of the at least one resonator microphone used to determine the voice signal is P2, and the number of the at least one resonator microphone used to determine the voice signal satisfies a condition P2<P1, wherein, P1 is equal to or greater than 5, and P2 is equal to or greater than 1,
    wherein during determining whether the received signal is a voice signal, the at least one resonator microphone of P2 number is turned on and the other of the plurality of resonator microphones is in a trigger OFF state.

2. The auto voice trigger method of claim 1, wherein the wideband signal is received and analyzed via the plurality of resonator microphones.

3. The auto voice trigger method of claim 1, wherein the wideband signal is received and analyzed via a wideband microphone.

4. The auto voice trigger method of claim 1, wherein, the at least one resonator microphone used to determine the voice signal comprises one resonator microphone operating in a frequency bandwidth within a voice signal band.

5. The auto voice trigger method of claim 4, wherein the at least one resonator microphone used to determine the voice signal further comprises at least one resonator microphone operating in a frequency bandwidth beyond the voice signal band so as to distinguish the voice signal from noise by comparing received signals.

6. The auto voice trigger method of claim 1, wherein, the at least one resonator microphone used to determine the voice signal comprises two or more resonator microphones operating in frequency bandwidths within a voice signal band.

7. The auto voice trigger method of claim 6, wherein the two or more resonator microphones used to determine the voice signal have adjacent frequency bandwidths.

8. The auto voice trigger method of claim 6, wherein the plurality of resonator microphones are arranged in an order of frequency bandwidths, and at least one resonator microphone operating in a frequency bandwidth between the frequency bandwidths of the two or more resonator microphones used to determine the voice signal is located between the two or more resonator microphones used to determine the voice signal.

9. The auto voice trigger method of claim 6, wherein the two or more resonator microphones used to determine the voice signal further comprise at least one resonator microphone operating in a frequency bandwidth beyond the voice signal band so as to distinguish the voice signal from noise by comparing received signals.

10. An audio analyzer comprising:
an array of a plurality of resonator microphones with different frequency bandwidths;
an auto voice trigger configured to determine whether a signal received by some resonator microphones among the plurality of resonator microphones with different frequency bandwidths is a voice signal; and
a controller, configured to wake up a whole system to receive and analyze a wideband signal, in response to determining that the signal received from the auto voice trigger is the voice signal,
wherein a number of the plurality of resonator microphones is P1, and a number of the at least one resonator microphone used to determine the voice signal is P2, and the number of the at least one resonator microphone used to determine the voice signal satisfies a condition P2<P1, wherein, P1 is equal to or greater than 5, and P2 is equal to or greater than 1,
wherein during determining whether the received signal is a voice signal, the at least one resonator microphone of P2 number is turned on and the other of the plurality of resonator microphones is in a trigger OFF state.

11. The audio analyzer of claim 10, wherein the wideband signal is received and analyzed via the plurality of resonator microphones.

12. The audio analyzer of claim 10, further comprising:
a wideband microphone configured to receive and analyze the wideband signal.

13. The audio analyzer of claim 10, wherein, at least one resonator microphone used to determine the voice signal comprises one resonator microphone operating in a frequency bandwidth within a voice signal band.

14. The audio analyzer of claim 13, wherein the at least one resonator microphone used to determine the voice signal further comprises at least one resonator microphone operating in a frequency bandwidth beyond the voice signal band, so as to distinguish the voice signal from noise by comparing received signals.

15. The audio analyzer of claim 10, wherein, at least one resonator microphone used to determine the voice signal comprises two or more resonator microphones operating in frequency bandwidths within a voice signal band.

16. The audio analyzer of claim 15, wherein the two or more resonator microphones used to determine the voice signal have adjacent frequency bandwidths.

17. The audio analyzer of claim 15, wherein the plurality of resonator microphones are arranged in an order of frequency bandwidths, and at least one resonator microphone operating in a frequency bandwidth between the frequency bandwidths of the two or more resonator microphones used to determine the voice signal is located between the two or more resonator microphones used to determine the voice signal.

18. The audio analyzer of claim 15, wherein the two or more resonator microphones used to determine the voice signal further comprise at least one resonator microphone operating in a frequency bandwidth beyond the voice signal band, so as to distinguish the voice signal from noise by comparing received signals.

* * * * *